US011885277B2

(12) United States Patent
Fujii et al.

(10) Patent No.: US 11,885,277 B2
(45) Date of Patent: Jan. 30, 2024

(54) METHOD AND DEVICE FOR CONTROLLING FUEL INJECTION TO ENGINE

(71) Applicant: Nikki Co., Ltd., Kanagawa-ken (JP)

(72) Inventors: Atsuhiro Fujii, Kanagawa-ken (JP); Ryuichi Oguro, Kanagawa-ken (JP)

(73) Assignee: NIKKI CO., LTD.

( * ) Notice: Subject to any disclaimer, the term of this patent is extended or adjusted under 35 U.S.C. 154(b) by 0 days.

(21) Appl. No.: 17/938,913

(22) Filed: Sep. 6, 2022

(65) Prior Publication Data

US 2023/0093638 A1 Mar. 23, 2023

(30) Foreign Application Priority Data

Sep. 7, 2021 (JP) ................................ 2021-145650

(51) Int. Cl.

*F02D 41/32* (2006.01)
*F02D 41/18* (2006.01)
*F02D 41/14* (2006.01)

(52) U.S. Cl.

CPC ........... *F02D 41/32* (2013.01); *F02D 41/182* (2013.01); *F02D 41/144* (2013.01); *F02D 2041/1433* (2013.01)

(58) Field of Classification Search

CPC ...... F02D 41/32; F02D 41/182; F02D 41/144; F02D 2041/1433; F02D 2041/1412; F02D 2200/0402; F02D 2200/0406

See application file for complete search history.

(56) References Cited

U.S. PATENT DOCUMENTS 5,889,205 A * 3/1999 Treinies .............. F02D 41/1401 73/114.32
2009/0157270 A1* 6/2009 Frauenkron ........... F02P 5/1521 701/54

FOREIGN PATENT DOCUMENTS

| | | | |
|---|---|---|---|
| JP | H05240073 A | 9/1993 | |
| JP | 2001521095 A | 11/2001 | |
| JP | 2008038872 A | 2/2008 | |
| WO | WO-9632579 A1 * | 10/1996 | ......... F02D 41/1401 |
| WO | WO-9735106 A2 * | 9/1997 | ......... F02D 41/0072 |

OTHER PUBLICATIONS

English abstract for JP-H05-240073.
English abstract for JP-2001-521095.
English abstract for JP-2008-038872.

* cited by examiner

*Primary Examiner* — Joseph J Dallo
(74) *Attorney, Agent, or Firm* — Fishman Stewart PLLC

(57) ABSTRACT

A method for controlling fuel injection to an engine may include calculating an amount of air passing through a throttle, which is actually controlled, from a calculated amount of air in an intake manifold, which is calculated from a pressure value detected by a pressure sensor installed in the intake manifold connecting the throttle and a cylinder to each other, and a calculated pressure change in the intake manifold. The method may further include predicting an actual amount of air to be sucked into the cylinder when mixed with fuel from the calculated amount of air in the intake manifold and the calculated amount of air passing through the throttle. The method may also include injecting an amount of fuel according to the predicted actual amount of air to be sucked into the cylinder.

19 Claims, 2 Drawing Sheets

METHOD AND DEVICE FOR CONTROLLING FUEL INJECTION TO ENGINE

CROSS REFERENCE TO RELATED APPLICATIONS

This application claims priority to Japanese Patent Application No. JP 2021-145650, filed on Sep. 7, 2021, the contents of which is hereby incorporated by reference in its entirety.

TECHNICAL FIELD

The present invention relates to a method and a device for controlling a fuel injection amount necessary for constantly maintaining a ratio (air-fuel ratio) between fuel and air supplied to an engine.

BACKGROUND

Conventionally, in order to control an engine with high accuracy for the purpose of improving fuel efficiency and rotation performance, fuel and air are mixed in an appropriate ratio (air-fuel ratio) to supply the fuel to the engine in an appropriate injection amount.

According to the invention related to a method for controlling fuel injection to an engine, in order to control the engine with high accuracy for the purpose of improving a vehicle in fuel efficiency and travelling performance, there has been provided a device for electronically controlling a throttle using an electronic control system to electronically opens or closes the throttle, instead of mechanically opening or closing the throttle based on a driver's operation of an accelerator. This is described, for example, in JP H05-240073 A and JP 2008-38872 A.

In addition, as a means for controlling a fuel injection amount through an appropriate air-fuel ratio, there has been known a means for appropriately controlling a fuel injection amount by estimating an amount of air when the air is mixed with fuel supplied to an engine on the basis of an amount of air in an intake manifold calculated from a pressure value detected by a pressure sensor installed in the intake manifold. This is disclosed, for example, in JP 2001-521095 A.

As illustrated in FIG. 1, in the means for controlling a fuel injection amount disclosed in the foregoing publication and the like, a throttle 5 is provided in an intake pipe 4 for supplying air into a cylinder 2 of an engine 1 via a filter 3, an intake manifold pressure sensor 7 detecting a pressure in an intake manifold 6 is provided in the intake manifold 6 disposed between each cylinder 2 and the intake pipe 4, and an electronic control unit (ECU) 9, in which a program for executing a method for controlling fuel injection, for example, on the basis of an opened degree signal from an accelerator 8 is stored in a storage means, transmits to the throttle 5 the opened degree signal obtained by calculating how much the throttle 5 is to be opened such that the throttle 5 is opened in a predetermined degree.

Since the air having passed through the opened throttle 5 is sent into the intake manifold 6, an amount of air in the intake manifold 6 is calculated from a pressure value in the intake manifold 6 detected by the intake manifold pressure sensor 7. Also, the ECU 9 calculates an optimum air-fuel ratio, and a necessary fuel amount is calculated from a value thereof. Then, fuel is injected from an injector 10 disposed in the vicinity of each cylinder 2 on the basis of an operating state detected, for example, using a signal from a crank angle sensor 12 provided in the engine 1. As a result, the fuel is mixed with the air sent from the intake pipe 4, and the fuel mixed with the air is sent into each cylinder 2 and ignited by an ignition plug 11, thereby rotating the engine.

SUMMARY

However, in the conventional means for controlling a fuel injection amount by estimating an amount of air to be mixed with fuel supplied to the engine on the basis of an amount of air in the intake manifold, the amount of air in the intake manifold is calculated from a pressure value detected by the pressure sensor installed in the intake manifold. For example, when a torque required for the engine needs to be rapidly changed such as when a vehicle on which the means for controlling a fuel injection amount is mounted suddenly accelerates or decelerates, that is, when an amount of air passing through the throttle 5 located upstream of the intake manifold 6 of the intake pipe 4 as illustrated in FIG. 1 is rapidly changed, the amount of air in the throttle 5 is different from that in the intake manifold 6 located downstream of the throttle 5. In the fuel injection based on the amount of air in the intake manifold 6, there is a problem that the fuel is mixed in a large or small amount with respect to the actual amount of air.

An object of the present invention is to provide a method and a device for controlling fuel injection to an engine capable of maintaining an ideal air-fuel ratio even if a torque required for the engine is rapidly changed in the conventional means for controlling a fuel injection amount by estimating an amount of air to be mixed with fuel supplied to the engine on the basis of an amount of air in the intake manifold.

According to the present invention made to solve the aforementioned problem, a method for controlling fuel injection to an engine includes: calculating an amount of air passing through a throttle, which is actually controlled, from an amount of air in an intake manifold calculated from a pressure value detected by a pressure sensor installed in the intake manifold connecting the throttle and a cylinder to each other, and a pressure change in the intake manifold; predicting an actual amount of air to be sucked into the cylinder when mixed with fuel from the calculated amount of air in the intake manifold and the calculated amount of air passing through the throttle; and injecting fuel according to the predicted amount of air to be sucked into the cylinder.

The present invention focuses on the fact that an amount of air between the amount of air in the intake manifold and the amount of air passing through the throttle is an actual amount of air to be mixed with fuel. In light thereof, the amount of air passing through the throttle, which is actually controlled, is calculated from the amount of air in the intake manifold calculated using the intake manifold pressure sensor and the pressure change, and the amount of air to be mixed with fuel is calculated using the amount of air in the intake manifold and the amount of air passing through the throttle.

In the present invention, the actual amount of air to be sucked into the cylinder when mixed with fuel is obtained using a pressure command value obtained by processing the pressure value in the intake manifold with a low-pass filter. As a result, it is possible to maintain a more accurate air-fuel ratio by eliminating the influence of noise in a high-frequency range caused by vibration of the engine or the like on the actual pressure value in the intake manifold.

In the present invention, the amount of air in the intake manifold can be calculated from the pressure value detected by the pressure sensor installed in the intake manifold using the following mathematical formula:

$$Q_a = K_c\frac{\omega}{\pi}\cdot\frac{V_c}{R\cdot T_m}\cdot P_m \quad \text{[Mathematical formula 4]}$$

where Qa is an amount of air in the manifold, Kc is a filling efficiency correction coefficient, ω is an rpm of the engine, Vc is a volume in the cylinder, R is a gas constant, Tm is a temperature in the manifold, and Pm is a pressure in the manifold.

In the present invention, the pressure change in the intake manifold connecting the throttle and the cylinder to each other is calculated from the amount of air in the intake manifold using the following mathematical formula:

$$\frac{d}{dt}P_m = \frac{R\cdot T_m}{V_m}\cdot(Q_t - Q_a) \quad \text{[Mathematical formula 5]}$$

where Vm is a volume in the manifold, R is a gas constant, Tm is a temperature in the manifold, Pm is a pressure in the manifold, Qa is an amount of air in the manifold, and Qt is an amount of air passing through the throttle.

In the present invention, the amount of air passing through the throttle, which is actually controlled, can be calculated from the calculated amount of air in the intake manifold and the calculated pressure change in the intake manifold using the following mathematical formula:

$$Q_t = \left(1 + \frac{V_m}{V_c}\cdot\frac{\pi}{K_c}\cdot\frac{1}{\omega}\cdot\frac{1}{P_m}\cdot\frac{d}{dt}P_m\right)\cdot Q_a \quad \text{[Mathematical formula 6]}$$

In addition, according to the present invention, a device for controlling fuel injection to an engine includes a program stored in a storage unit to execute the above-described method for controlling fuel injection to an engine by inputting a pressure signal detected by the pressure sensor installed in the intake manifold, and generating a fuel injection signal and outputting the fuel injection signal to an injector.

As described above, according to the present invention, it is possible to provide a method and a device for controlling fuel injection to an engine capable of maintaining an ideal air-fuel ratio even if a torque required for the engine is rapidly changed in a means for controlling a fuel injection amount by estimating an amount of air to be mixed with fuel supplied to the engine on the basis of an amount of air in the intake manifold.

DETAILED DESCRIPTION

Hereinafter, embodiments of the present invention will be described with reference to the drawings.

Figure 1:
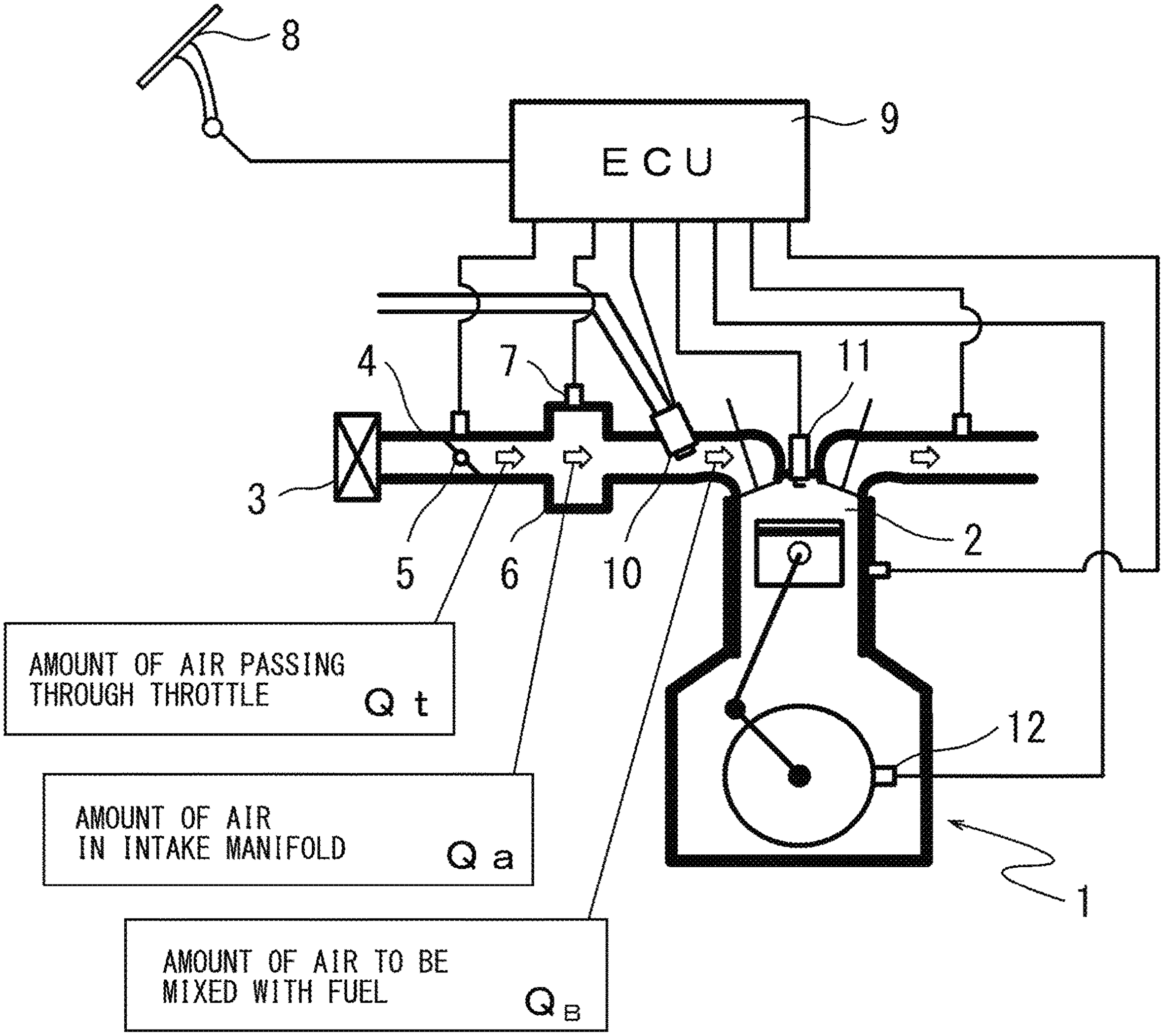
FIG. 1 is a schematic diagram of a device for controlling fuel injection to an engine for implementing an example of the conventional art and an embodiment of the present invention.

FIG. 1 is a schematic diagram of a device for controlling fuel injection to an engine for carrying out an embodiment of the present invention, and basic components and a control method thereof are basically similar to those in the above-described example of the conventional art, but are different in that an amount Qt of air passing through a throttle, which is actually controlled, is calculated from an amount of air in an intake manifold 6 calculated from a pressure value detected by a pressure sensor 7 installed in the intake manifold 6 connecting the throttle and a cylinder 2 to each other, and a pressure change in the intake manifold 6, an actual amount of air to be sucked into the cylinder when mixed with fuel is predicted from the calculated amount Qa of air in the intake manifold and the calculated amount Qt of air passing through the throttle, and fuel is injected according to the predicted amount of air to be sucked into the cylinder.

More specifically, first, the amount Qa of air in the intake manifold obtained by the intake manifold pressure sensor 7 is obtained according to the following Formula (1).

In Formula (1) and the formulas to be used below, Kc denotes a filling efficiency correction coefficient, ω denotes an rpm of the engine, Vc denotes a volume in the cylinder, R denotes a gas constant, Tm denotes a temperature in the manifold, Pm denotes a pressure value in the manifold, and Vm denotes a volume in the manifold.

[Mathematical formula 7]

$$Q_a = K_c\frac{\omega}{\pi}\cdot\frac{V_c}{R\cdot T_m}\cdot P_m \quad (1)$$

Next, a pressure change in the intake manifold 6 connecting the throttle 5 and the cylinder 2 to each other is obtained according to the following Formula (2) using the amount Qa of air in the intake manifold obtained according to Formula (1). In Formula (2), Qt denotes an amount of air passing through the throttle.

[Mathematical formula 8]

$$\frac{d}{dt}P_m = \frac{R\cdot T_m}{V_m}\cdot(Q_t - Q_a) \quad (2)$$

In addition, the amount Qt of air passing through the throttle is obtained according to the following Formula (3) using Formulas (1) and (2).

[Mathematical formula 9]

$$Q_t = \left(1 + \frac{V_m}{V_c}\cdot\frac{\pi}{K_c}\cdot\frac{1}{\omega}\cdot\frac{1}{P_m}\cdot\frac{d}{dt}P_m\right)\cdot Q_a \quad (3)$$

At this time, the pressure Pm in the intake manifold is controlled to satisfy the following Formula (4) using a pressure proportional gain Kpm and a pressure command value Pmref in the intake manifold.

[Mathematical formula 10]

$$\frac{d}{dt}P_m = K_{pm}\cdot(P_{mref} - P_m) \quad (4)$$

Then, Formula (4) is put into Formula (3), and the amount Qt of air passing through the throttle is rewritten as the following Formula (5).

[Mathematical formula 11]

$$Q_t = \left(1 + \frac{V_m}{V_c} \cdot \frac{\pi}{K_c} \cdot \frac{K_{pm}}{\omega} \cdot \frac{P_{mref} - P_m}{P_m}\right) \cdot Q_a = \left(1 + K_{PQT} \cdot \frac{P_{mref} - P_m}{P_m}\right) \cdot Q_a \quad (5)$$

$$\left(K_{PQT} = \frac{V_m}{V_c} \cdot \frac{\pi}{K_c} \cdot \frac{K_{pm}}{\omega}\right)$$

Figure 2:
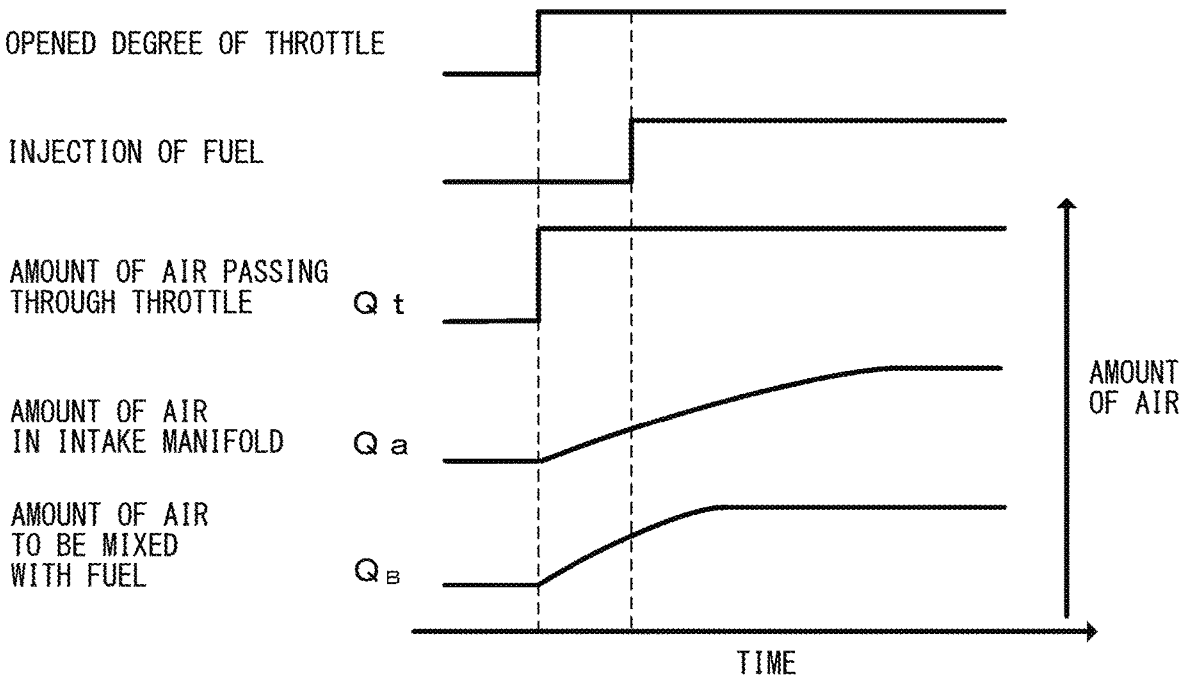
FIG. 2 is a diagram showing temporal changes in an amount of air passing through a throttle, an amount of air in an intake manifold, and an amount of air to be mixed with fuel when an opened degree of the throttle is changed in the embodiment shown in FIG. 1.

Here, as shown in FIG. 2, it has been found that an ideal air-fuel ratio cannot be maintained unless fuel injection is performed with respect to a mid-amount of air between the amount Qa of air in the intake manifold and the amount Qt of air passing through the throttle, because the amount of air rapidly changes when a rapid change is required in the torque required for the engine.

Here, the mid-amount $Q_B$ of air between the amount Qa of air in the intake manifold obtained according to Formula (1) and the amount Qt of air passing through the throttle obtained according to Formula (5) is estimated according to the following Formula (6) using an adjustment gain $K_{PQB}$.

[Mathematical formula 12]

$$Q_B = \left(1 + K_{PQB} \cdot \frac{P_{mref} - P_m}{P_m}\right) \cdot Q_a \quad (6)$$

Therefore, by injecting fuel according to the amount Qa of air in the intake manifold 6 obtained from the pressure Pm in the intake manifold, the amount Qt of air passing through the throttle obtained from the pressure change in the intake manifold 6, and the amount $Q_B$ of air to be mixed with fuel using Formula (6), it is possible to appropriately inject fuel, thereby maintaining an ideal air-fuel ratio even if the torque required for the engine is rapidly changed.

In actual use, the pressure value Pm in the intake manifold may be influenced by noise in a high-frequency region due to vibration generated while the engine or the like is being operated.

Therefore, as shown in the following Formula (7), by using a pressure value $P_{mMODEL}$ in the intake manifold obtained by processing the pressure value Pm in the intake manifold with a low-pass filter, it is possible to maintain a more accurate air-fuel ratio by eliminating the influence of the noise in the high-frequency range or the like caused by the vibration of the engine or the like on the actual pressure value in the intake manifold.

[Mathematical formula 13]

$$Q_B = \left(1 + K_{PQB} \cdot \frac{P_{mref} - P_{mMODEL}}{\Delta + P_{mMODEL}}\right) \cdot Q_a \quad (7)$$

Here, Δ is a constant for adjusting sensitivity, and is put in a denominator to prevent oscillation even when $P_{mMODEL}$ approaches 0 infinitely.

What is claimed is:

1. A method for controlling fuel injection to an engine, the method comprising:

calculating an amount of air passing through a throttle, which is actually controlled, from a calculated amount of air in an intake manifold, which is calculated from a pressure value detected by a pressure sensor installed in the intake manifold connecting the throttle and a cylinder to each other, and a calculated pressure change in the intake manifold;

predicting an actual amount of air to be sucked into the cylinder when mixed with fuel from the calculated amount of air in the intake manifold and the calculated amount of air passing through the throttle; and injecting an amount of fuel according to the predicted actual amount of air to be sucked into the cylinder;

wherein the calculated amount of air in the intake manifold is calculated from the pressure value detected by the pressure sensor installed in the intake manifold using the formula:

$$Q_a = K_c \frac{\omega}{\pi} \cdot \frac{V_c}{R \cdot T_m} \cdot P_m;$$

and wherein $Q_a$ is the calculated amount of air in the intake manifold, $K_c$ is a filling efficiency correction coefficient, ω is a revolutions per minute (rpm) of the engine, $V_c$ is a volume in the cylinder, R is a gas constant, $T_m$ is a temperature in the intake manifold, and $P_m$ is a pressure in the intake manifold.

2. The method for controlling fuel injection according to claim 1, wherein the actual amount of air to be sucked into the cylinder when mixed with fuel is obtained using a pressure command value obtained by processing the pressure value in the intake manifold with a low-pass filter.

3. A method for controlling fuel injection to an engine, the method comprising:

calculating an amount of air passing through a throttle, which is actually controlled, from a calculated amount of air in an intake manifold, which is calculated from a pressure value detected by a pressure sensor installed in the intake manifold connecting the throttle and a cylinder to each other, and a calculated pressure change in the intake manifold;

predicting an actual amount of air to be sucked into the cylinder when mixed with fuel from the calculated amount of air in the intake manifold and the calculated amount of air passing through the throttle; and injecting an amount of fuel according to the predicted actual amount of air to be sucked into the cylinder;

wherein the calculated pressure change in the intake manifold connecting the throttle and the cylinder to each other is calculated from the calculated amount of air in the intake manifold using the formula:

$$\frac{d}{dt} P_m = \frac{R \cdot T_m}{V_m} \cdot (Q_t - Q_a);$$

and wherein $V_m$ is a volume in the intake manifold, R is a gas constant, $T_m$ is a temperature in the intake manifold, $P_m$ is a pressure in the intake manifold, $Q_a$ is the calculated amount of air in the intake manifold, and $Q_t$ is the amount of air passing through the throttle.

4. A method for controlling fuel injection to an engine, the method comprising:

calculating an amount of air passing through a throttle, which is actually controlled, from a calculated amount of air in an intake manifold, which is calculated from a pressure value detected by a pressure sensor installed in the intake manifold connecting the throttle and a cylinder to each other, and a calculated pressure change in the intake manifold;

predicting an actual amount of air to be sucked into the cylinder when mixed with fuel from the calculated amount of air in the intake manifold and the calculated amount of air passing through the throttle; and injecting an amount of fuel according to the predicted actual amount of air to be sucked into the cylinder;

wherein the amount of air passing through the throttle, which is actually controlled, is calculated from the calculated amount of air in the intake manifold and the calculated pressure change in the intake manifold using the formula:

$$Q_t = \left(1 + \frac{V_m}{V_c} \cdot \frac{\pi}{K_c} \cdot \frac{1}{\omega} \cdot \frac{1}{P_m} \cdot \frac{d}{d_t} P_m\right) \cdot Q_a;$$

and wherein $Q_t$ is the amount of air passing through the throttle, $V_m$ is a volume in the intake manifold, $V_c$ is a volume in the cylinder, $K_c$ is a filling efficiency correction coefficient, ω is a revolutions per minute (rpm) of the engine, $P_m$ is a pressure in the intake manifold, and $Q_a$ is the calculated amount of air in the intake manifold.

5. The method for controlling fuel injection according to claim 2, wherein the calculated pressure change in the intake manifold connecting the throttle and the cylinder to each other is calculated from the calculated amount of air in the intake manifold using the formula $$\frac{d}{dt} P_m = \frac{R \cdot T_m}{V_m} \cdot (Q_t - Q_a);$$

and wherein $V_m$ is a volume in the intake manifold, R is the gas constant, $T_m$ is the temperature in the intake manifold, $P_m$ is the pressure in the intake manifold, $Q_a$ is the calculated amount of air in the intake manifold, and $Q_t$ is the amount of air passing through the throttle.

6. The method for controlling fuel injection according to claim 2, wherein the amount of air passing through the throttle, which is actually controlled, is calculated from the calculated amount of air in the intake manifold and the calculated pressure change in the intake manifold using the formula:

$$Q_t = \left(1 + \frac{V_m}{V_c} \cdot \frac{\pi}{K_c} \cdot \frac{1}{\omega} \cdot \frac{1}{P_m} \cdot \frac{d}{d_t} P_m\right) \cdot Q_a;$$

and wherein $Q_t$ is the amount of air passing through the throttle, $V_m$ is a volume in the intake manifold, $V_c$ is the volume in the cylinder, $K_c$ is the filling efficiency correction coefficient, ω is the revolutions per minute (rpm) of the engine, $P_m$ is the pressure in the intake manifold, and $Q_a$ is the calculated amount of air in the intake manifold.

7. A device for controlling fuel injection to an engine, the device comprising: a program stored in a storage unit to execute the method for controlling fuel injection according to claim 2 via inputting a pressure signal detected by the pressure sensor installed in the intake manifold, generating a fuel injection signal, and outputting the fuel injection signal to an injector.

8. The method for controlling fuel injection according to claim 1, wherein the calculated pressure change in the intake manifold connecting the throttle and the cylinder to each other is calculated from the calculated amount of air in the intake manifold using the formula:

$$\frac{d}{dt} P_m = \frac{R \cdot T_m}{V_m} \cdot (Q_t - Q_a);$$

and wherein $V_m$ is a volume in the intake manifold, R is the gas constant, $T_m$ is the temperature in the intake manifold, $P_m$ is the pressure in the intake manifold, $Q_a$ is the calculated amount of air in the intake manifold, and $Q_t$ is the amount of air passing through the throttle.

9. The method for controlling fuel injection according to claim 1, wherein the amount of air passing through the throttle, which is actually controlled, is calculated from the calculated amount of air in the intake manifold and the calculated pressure change in the intake manifold using the formula:

$$Q_t = \left(1 + \frac{V_m}{V_c} \cdot \frac{\pi}{K_c} \cdot \frac{1}{\omega} \cdot \frac{1}{P_m} \cdot \frac{d}{d_t} P_m\right) \cdot Q_a;$$

and wherein $Q_t$ is the amount of air passing through the throttle, $V_m$ is a volume in the intake manifold, $V_c$ is the volume in the cylinder, $K_c$ is the filling efficiency correction coefficient, ω is the revolutions per minute (rpm) of the engine, $P_m$ is the pressure in the intake manifold, and $Q_a$ is the calculated amount of air in the intake manifold.

10. A device for controlling fuel injection to an engine, the device comprising: a program stored in a storage unit to execute the method for controlling fuel injection according to claim 1 via inputting a pressure signal detected by the pressure sensor installed in the intake manifold, generating a fuel injection signal, and outputting the fuel injection signal to an injector.

11. The method for controlling fuel injection according to claim 3, wherein the amount of air passing through the throttle, which is actually controlled, is calculated from the calculated amount of air in the intake manifold and the calculated pressure change in the intake manifold using the formula:

$$Q_t = \left(1 + \frac{V_m}{V_c} \cdot \frac{\pi}{K_c} \cdot \frac{1}{\omega} \cdot \frac{1}{P_m} \cdot \frac{d}{d_t} P_m\right) \cdot Q_a;$$

and wherein $Q_t$ is the amount of air passing through the throttle, $V_m$ is the volume in the intake manifold, $V_c$ is a volume in the cylinder, $K_c$ is a filling efficiency correction coefficient, ω is a revolutions per minute (rpm) of the engine, $P_m$ is the pressure in the intake manifold, and $Q_a$ is the calculated amount of air in the intake manifold.

12. A device for controlling fuel injection to an engine, the device comprising: a program stored in a storage unit to execute the method for controlling fuel injection according to claim 3 via inputting a pressure signal detected by the pressure sensor installed in the intake manifold, generating a fuel injection signal, and outputting the fuel injection signal to an injector.

13. A device for controlling fuel injection to an engine, the device comprising: a program stored in a storage unit to execute the method for controlling fuel injection according to claim 4 via inputting a pressure signal detected by the pressure sensor installed in the intake manifold, generating a fuel injection signal, and outputting the fuel injection signal to an injector.

14. The method for controlling fuel injection according to claim 4, wherein the actual amount of air to be sucked into the cylinder when mixed with fuel is obtained using a pressure command value obtained by processing the pressure value in the intake manifold with a low-pass filter.

15. The method for controlling fuel injection according to claim 4, wherein:

the calculated amount of air in the intake manifold is calculated from the pressure value detected by the pressure sensor installed in the intake manifold using the formula:

$$Q_a = K_c\frac{\omega}{\pi}\cdot\frac{V_c}{R\cdot T_m}\cdot P_m;$$

$Q_a$ is the calculated amount of air in the intake manifold, $K_c$ is the filling efficiency correction coefficient, ω is the revolutions per minute (rpm) of the engine, $V_c$ is the volume in the cylinder, R is a gas constant, $T_m$ is a temperature in the intake manifold, and $P_m$ is the pressure in the intake manifold;

the calculated pressure change in the intake manifold connecting the throttle and the cylinder to each other is calculated from the calculated amount of air in the intake manifold using the formula $$\frac{d}{dt}P_m = \frac{R\cdot T_m}{V_m}\cdot(Q_t - Q_a);$$

and $V_m$ is the volume in the intake manifold, R is the gas constant, $T_m$ is the temperature in the intake manifold, $P_m$ is the pressure in the intake manifold, $Q_a$ is the calculated amount of air in the intake manifold, and $Q_t$ is the amount of air passing through the throttle.

16. The method for controlling fuel injection according to claim 15, wherein the actual amount of air to be sucked into the cylinder when mixed with fuel is obtained using a pressure command value obtained by processing the pressure value in the intake manifold with a low-pass filter.

17. A device for controlling fuel injection to an engine, the device comprising: a program stored in a storage unit to execute the method for controlling fuel injection according to claim 16 via inputting a pressure signal detected by the pressure sensor installed in the intake manifold, generating a fuel injection signal, and outputting the fuel injection signal to an injector.

18. A device for controlling fuel injection to an engine, the device comprising: a program stored in a storage unit to execute the method for controlling fuel injection according to claim 15 via inputting a pressure signal detected by the pressure sensor installed in the intake manifold, generating a fuel injection signal, and outputting the fuel injection signal to an injector.

19. The method for controlling fuel injection according to claim 3, wherein the actual amount of air to be sucked into the cylinder when mixed with fuel is obtained using a pressure command value obtained by processing the pressure value in the intake manifold with a low-pass filter.

* * * * *